United States Patent  
Ponnuraj et al.

(10) Patent No.: US 12,043,181 B2
(45) Date of Patent: Jul. 23, 2024

(54) DRIVER ASSISTANCE FOR A MOTOR VEHICLE

(71) Applicant: VALEO NORTH AMERICA, INC., Troy, MI (US)

(72) Inventors: Sangita Ponnuraj, Troy, MI (US); Veerendra Dasari, Troy, MI (US); Anand Kathiresan, Troy, MI (US); Kirk Billings, Troy, MI (US)

(73) Assignee: Connaught Electronics Ltd., Tuam (IE)

( * ) Notice: Subject to any disclaimer, the term of this patent is extended or adjusted under 35 U.S.C. 154(b) by 36 days.

(21) Appl. No.: 18/065,315

(22) Filed: Dec. 13, 2022

(65) Prior Publication Data

US 2024/0190347 A1 Jun. 13, 2024

(51) Int. Cl.
B60R 1/22 (2022.01)

(52) U.S. Cl.
CPC .......... B60R 1/22 (2022.01); *B60R 2300/303* (2013.01)

(58) Field of Classification Search
CPC .............. G06V 20/56; B60R 2300/303; B60R 2300/304; B60R 1/22; B60R 1/26
See application file for complete search history.

(56) References Cited

U.S. PATENT DOCUMENTS

| 2018/0220081 | A1* | 8/2018 | Lewis | G06T 7/13 |
| 2018/0362026 | A1* | 12/2018 | Heimberger | B60R 11/04 |
| 2022/0144169 | A1* | 5/2022 | Sperrle | G06V 20/56 |
| 2022/0266749 | A1* | 8/2022 | Kuruba | B60K 35/00 |
| 2022/0314884 | A1* | 10/2022 | Uppara | B60R 1/26 |
| 2022/0371514 | A1* | 11/2022 | Castro | B60R 1/00 |
| 2023/0064558 | A1* | 3/2023 | Griffin | H04N 9/646 |

* cited by examiner

*Primary Examiner* — Jayanti K Patel
*Assistant Examiner* — Christopher Kingsbury Glover
(74) *Attorney, Agent, or Firm* — Connaught Electronics Ltd.

(57) ABSTRACT

A driver assistance system and driver assistance method for a combination of a motor vehicle and a trailer, which includes a first camera located on the motor vehicle configured to generate a first image, and a second camera located on the trailer configured to generate a second image, and a computer processing device configured to determine a first distance and a second distance by a sensor or a user input, determine a bowl view responsive to the first distance and the second distance in relation to a threshold distance, and generate a combined image from the second image and the first image responsive to the bowl view.

20 Claims, 5 Drawing Sheets

User attaches trailer to motor vehicle by hitch connection and hitch location.
510

First camera is installed on motor vehicle in order to generate a first image, which is provided to the interactive display.
520

Second camera is installed on trailer in order to generate a second image, which is provided to the interactive display.
530

Determine a first length distance for input into interactive display.
540

Determine a second width distance for input into interactive display.
550

Computer processing device having image function algorithm applies appropriate set of polynomial fit array coefficients based on inputted distances.
560

If first length distance is less than a specified threshold distance, then a first set of the polynomial fit array coefficients are applied.
570A

If first length distance is equal to or greater than a specified threshold distance, then a second set of the polynomial fit array coefficients are applied.
570B

Combined image is generated from first image and second image on interactive display.
580

Generate, by a first camera located on a motor vehicle, a first image.
610

Generate, by a second camera located on a trailer, a second image.
620

Determine, by a sensor or a user, a first distance and a second distance.
630

First distance is a length from a front face of the trailer to a rear face of a passenger cab of the motor vehicle where the first camera is located, and second distance is a width of a front face of the trailer.
635

Determine, by a computer processing device, a bowl view responsive to the first distance and the second distance in relation to a threshold distance.
640

Threshold distance is 55 inches.
645

Generate, by the computer processing device, a combined image from the second image and the first image responsive to the bowl view.
650

Apply an image function algorithm based on the first distance, the second distance, the threshold distance, and one of a plurality of sets of polynomial fit array coefficients.
655

Apply a first set of the polynomial fit array coefficients when the first distance is less than the threshold distance, and apply a second set of the polynomial fit array coefficients when the first distance is equal to or greater than the threshold distance.
657

FIG. 6

DRIVER ASSISTANCE FOR A MOTOR VEHICLE

TECHNICAL FIELD

Disclosed herein is a driver assistance system for a combination of a motor vehicle and a trailer.

BACKGROUND OF THE INVENTION

Motor vehicles can include trailers being pulled or towed from the rear side of the motor vehicle. This trailer can provide the user of the motor vehicle with an obstructed rear field of view, also known as a blind spot, at the rear side of the motor vehicle. A driver assistance system with a plurality of cameras, an interactive display and a computer processing device can provide an improved rear field of view for the user of the motor vehicle when the trailer is present.

SUMMARY OF THE INVENTION

A driver assistance system for a combination of a motor vehicle and a trailer. The driver assistance system includes a first camera located on the motor vehicle, the first camera configured to generate a first image. The driver assistance system further includes a second camera located on the trailer, the second camera configured to generate a second image. The driver assistance system additionally includes a computer processing device configured to determine a first distance and a second distance by a sensor or a user input. The driver assistance system moreover includes a computer processing device configured to determine a bowl view responsive to the first distance and the second distance in relation to a threshold distance. The driver assistance system further includes a computer processing device configured to generate a combined image from the second image and the first image responsive to the bowl view.

A method for driver assistance for a combination of a motor vehicle and a trailer. The method includes generating, by a first camera located on the motor vehicle, a first image. The method further includes generating, by a second camera located on the trailer, a second image. The method additionally includes determining, by a sensor or a user, a first distance and a second distance. The method moreover includes determining, by a computer processing device, a bowl view responsive to the first distance and the second distance in relation to a threshold distance. The method further includes generating, by the computer processing device, a combined image from the second image and the first image responsive to the bowl view.

A non-transitory computer-readable storage medium storing instructions, which when executed on a computer, cause the computer to perform a method for driver assistance for a combination of a motor vehicle and a trailer. The method includes generating, by a first camera located on the motor vehicle, a first image. The method further includes generating, by a second camera located on the trailer, a second image. The method additionally includes determining, by a sensor or a user, a first distance and a second distance. The method moreover includes determining, by a computer processing device, a bowl view responsive to the first distance and the second distance in relation to a threshold distance. The method further includes generating, by the computer processing device, a combined image from the second image and the first image responsive to the bowl view.

The foregoing elements and features can be combined in various combinations without exclusivity, unless expressly indicated otherwise. These elements and features, as well as the operation thereof, will become more apparent in view of the following detailed description with accompanying drawings. It should be understood that the following detailed description and accompanying drawings are intended to be exemplary in nature and non-limiting.

BRIEF DESCRIPTION OF DRAWINGS

The embodiments of the present disclosure are pointed out with particularity in the appended claims. Various other features will become more apparent to those skilled in the art from the following detailed description of the disclosed non-limiting embodiments and will be best understood by referring to the following detailed description along with the accompanying drawings in which:

DETAILED DESCRIPTION OF THE INVENTION

Detailed embodiments of the present invention are disclosed herein. It is to be understood that the disclosed embodiments are merely examples of the invention that can be embodied in various and alternative forms. The Figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features described and illustrated with reference to any one of the Figures can be combined with features illustrated in one or more other Figures to produce embodiments that are not explicitly described or illustrated. The combinations of features illustrated provide representative embodiments for typical applications. However, various modifications and combinations of the features consistent with the teachings of this disclosure can be desired for particular applications or implementations.

Motor vehicles are often equipped to pull or tow items, such as trailer, from the rear side of the motor vehicle. However, the rear side of the motor vehicle is then provided with an obstructed field of view from the item being pulled or towed, commonly called "blind spots". A driver assistance system, including a plurality of cameras, an interactive display and a computer processing device, assists with providing a clearer view of the motor vehicle rear side for the user when an item is being pulled or towed. The plurality of cameras, an interactive display and a computer processing device communicate with each other to aid in providing an unobstructed field of view of the rear side of the motor vehicle for the user.

Items that are pulled or towed by a motor vehicle, such as a trailer, are attached to each other via a hitch connection, which can be located on the rear end of the motor vehicle or within the cargo bed of the motor vehicle, for example. Various hitches are designed to pull or tow various items, such as smaller or larger trailers, light-weight or heavy-weight trailers, narrower or wider trailers, and shorter or longer trailers, for example. For larger, heavy-weight, wider or longer trailers, a specific hitch can be required, such as a Gooseneck or Fifth-wheel hitch, which is located within the cargo bed of the motor vehicle. The aforementioned Gooseneck or Fifth-wheel hitch leads to the front face of the trailer becoming much closer in distance to the rear face of the passenger cab of the motor vehicle. This trailer face-to-cab face distance varies vastly by the type of hitch employed, motor vehicle cargo bed type (eg: short, standard, long) and trailer shape design size. A driver assistance system, including a plurality of cameras, an interactive display and a computer processing device, facilitates to provide an unobstructed field of view of the rear side of the motor vehicle for the user regardless of the trailer dimensions, shape, design, size.

A first camera located on a motor vehicle provides a first image while a second camera located on a trailer provides a second image. The first image and the second image construct a combined image for viewing on an interactive display via a computer processing device. A first distance and a second distance are determined by a sensor or a user, then the computer processing device is configured to utilize the first distance and second distance to determine a bowl size and bowl view of the second image for the generated combined image in relation to a threshold distance. The computer processing device is configured to generate the combined image on the interactive display from the first image and the second image, responsive to the determined bowl size and bowl view relative to the first distance, the second distance, and the threshold distance. Furthermore, the computer processing device determines the bowl size and bowl view, for constructing the combined image, by utilizing and applying an image function algorithm based on the first distance, the second distance, the threshold distance, and one of a plurality of sets of polynomial fit array coefficients. The function algorithm contains the plurality of sets of polynomial fit array coefficients and applies a specific set of polynomial fit array coefficients based on the first distance, the second distance, and the threshold distance, in order to create the combined image with appropriate bowl size and bowl view for the second image in relation to the first image.

Figures 1A, 1B:
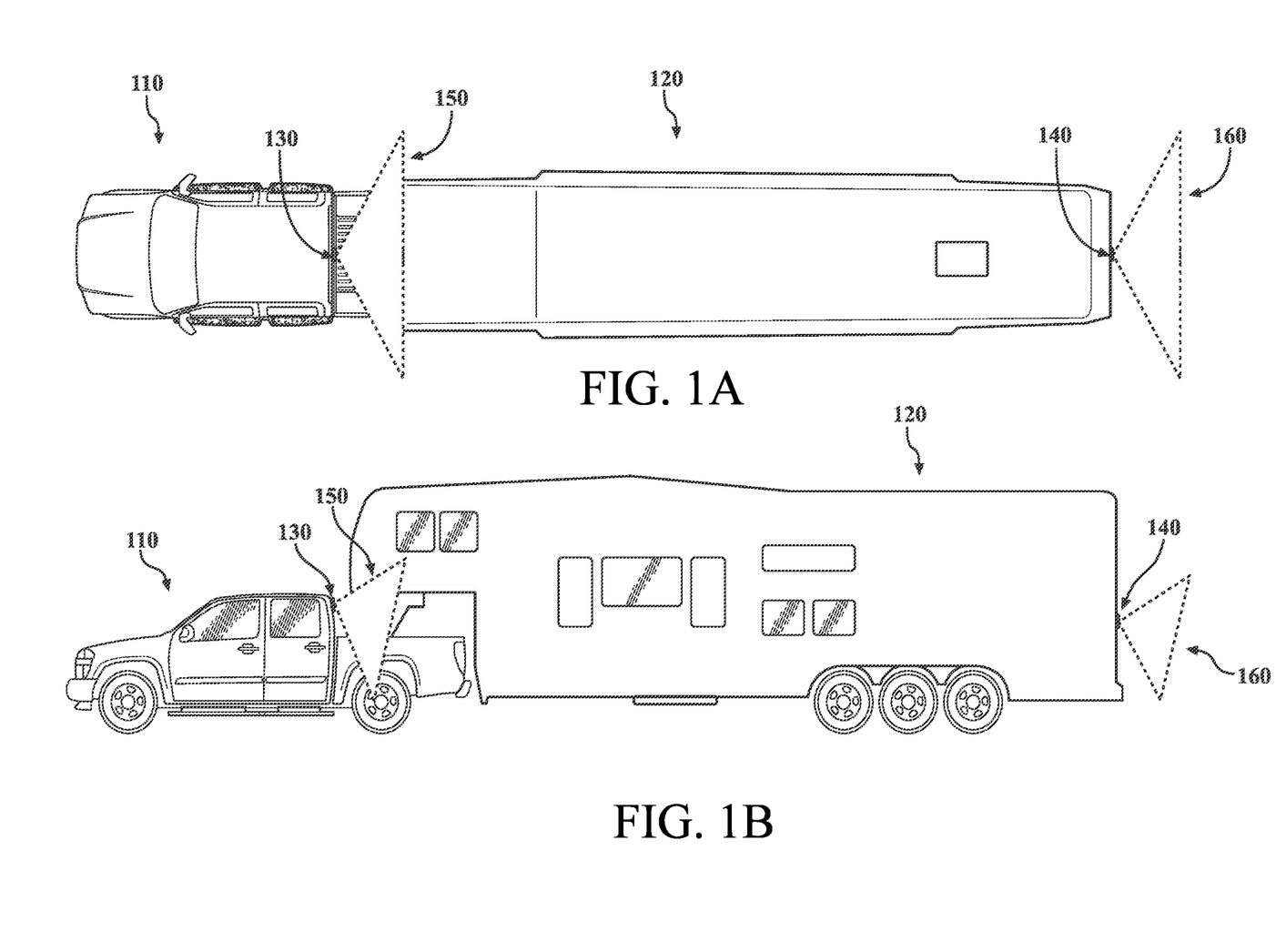
FIG. 1A illustrates an example of a motor vehicle with a trailer located at the rear side and a driver assistance system from a top view perspective.
FIG. 1B illustrates an example of a motor vehicle with a trailer located at the rear side and a driver assistance system from a side view perspective.

FIG. 1A and FIG. 1B illustrate examples of a motor vehicle with a trailer located at the rear side and a driver assistance system. FIG. 1A illustrates an example of a motor vehicle with a trailer located at the rear side and a driver assistance system from a top view perspective. FIG. 1B illustrates an example of a motor vehicle with a trailer located at the rear side and a driver assistance system from a side view perspective. The motor vehicle 110 can be, for example, a truck, heavy-duty truck, commercial vehicle, or any automobile capable of pulling or towing an item(s) from its rear side, such as, for example, a trailer 120, storage container, wheeled-equipment, camper, mobile home, recreational vehicle, automobile, motor vehicle, machinery, wheeled-vessel, wheeled-object, or the like. The driver assistance system can be a plurality of cameras, an interactive display and a computer processing device. The plurality of cameras can be located on the interior or exterior of the motor vehicle and located on the interior or exterior of the trailer.

For example, a camera 130 can be located on the rear face of the passenger cab of the motor vehicle 110, as seen in FIG. 1A and FIG. 1B. For further example, the camera 130 can be located at the Center High Mounted Stop Lamp (CHMSL) position of the rear face of the passenger cab of the motor vehicle 110. Furthermore, but not limited to, a camera can be mounted to the exterior trim, red stop lamp, tailgate, cargo bed, fender, lift-gate, roof, door, rear surface face, or side on a motor vehicle, wherein the camera is aimed toward the rear direction of the motor vehicle. Moreover, the plurality of cameras can optionally be effortlessly relocated, moved and installed about the motor vehicle, or the plurality of cameras can be fixed in a location about the motor vehicle. A first camera 130 located on the rear face of the passenger cab of the motor vehicle 110 provides a first image 150, which will be presented on the interactive display located within the passenger cab of the motor vehicle.

For example, a camera 140 can be located on the rear face of the trailer 120, as seen in FIG. 1A and FIG. 1B. For further example, the camera 140 can be located at the Center High Mounted Stop Lamp (CHMSL) position of the rear face of the trailer 120. Furthermore, but not limited to, a camera can be mounted to the exterior trim, red stop lamp, tailgate, cargo bed, fender, lift-gate, roof, door, rear surface face, or side on a trailer, wherein the camera is aimed toward the rear direction of the motor vehicle. Moreover, the plurality of cameras can optionally be effortlessly relocated, moved and installed about the trailer, or the plurality of cameras can be fixed in a location about the trailer. A second camera 140 located on the rear face of the trailer 120 provides a second image 160, different from the first image 150, which will be presented on the interactive display located within the passenger cab of the motor vehicle.

Additionally, the plurality of cameras located on the motor vehicle and the trailer can be connected to the motor vehicle power source, thus the plurality of cameras being energized by the motor vehicle power source. Alternatively, the plurality of cameras located on the motor vehicle and the trailer can be energized by a remote power source, such as, but not limited to, a battery or solar energy. Additionally, a camera of the plurality of cameras captures an image through a lens, which can have a fisheye field of view, bowl-view, wide-angle view, panoramic view, or combination thereof to provide a field of view ranging from 1-180°.

Figure 2A:
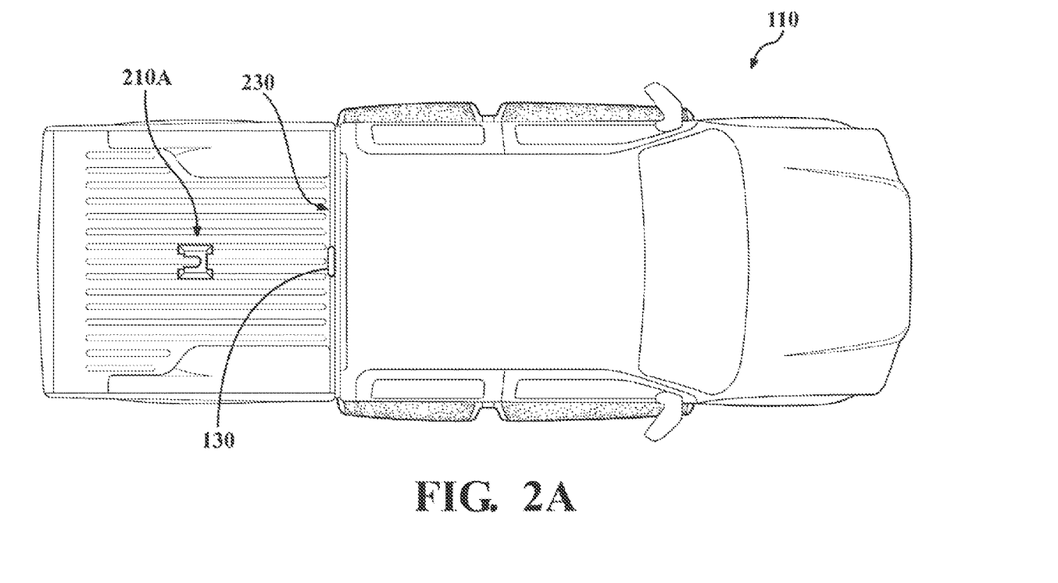
FIG. 2A illustrates an example of a hitch location for a motor vehicle.
Figure 2B:
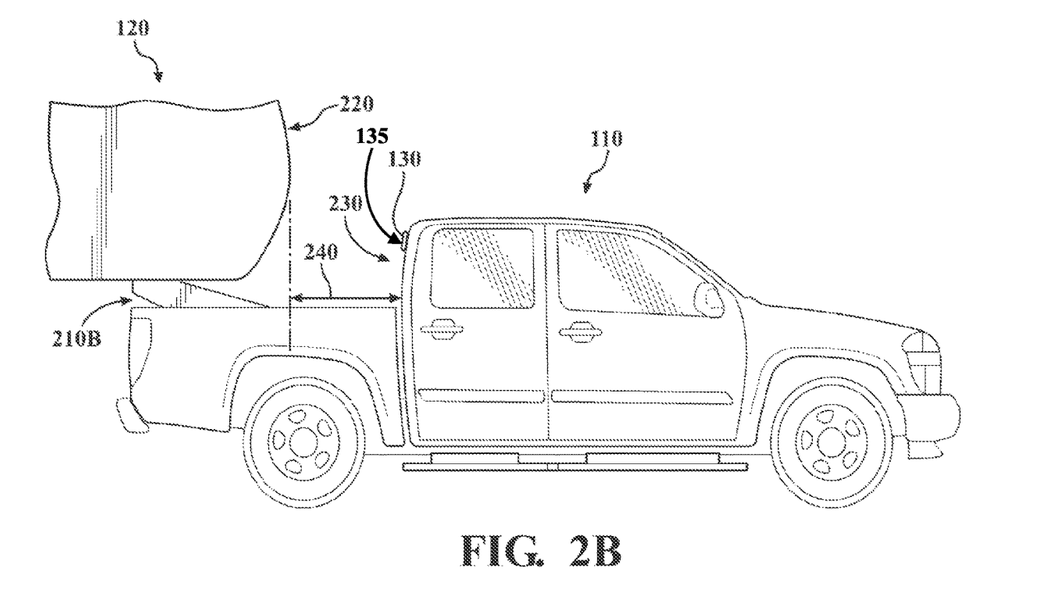
FIG. 2B illustrates an example of a trailer attached to a hitch of a motor vehicle.

FIG. 2A and FIG. 2B illustrate examples of a hitch connection for a combination of a motor vehicle and a trailer. FIG. 2A illustrates an example of a hitch location 210A for a motor vehicle 110. FIG. 2B illustrates an example of a trailer 120 with a hitch connection 210B attached to a hitch location 210A of a motor vehicle 110. The hitch location 210A can located on the rear end of the motor vehicle 110, within the cargo bed of the motor vehicle, or on the cargo bed of the motor vehicle. For example, the hitch location 210A of a motor vehicle 110 is intended to pull or tow a trailer 120. For specific trailers, a specialized hitch connection 210B can be required, such as a Gooseneck or Fifth-wheel hitch, which is attached to a hitch location 210A within the cargo bed of the motor vehicle 110. As is common practice for motor vehicle-trailer attachment, the unlabeled vertical protrusion of hitch connection 210B fits in and is secured within the unlabeled aperture or slot of hitch location 210A. The aforementioned Gooseneck or Fifth-wheel hitch location 210A can be located directly above the rear wheel axel within the cargo bed of the motor vehicle 110, at the horizontal center point of the cargo bed of the motor vehicle, at the vertical center point of the cargo bed of the motor vehicle, or any combination thereof. With a Gooseneck or Fifth-wheel hitch location 210A and hitch connection 210B, the length distance 240 between the front face 220 of the trailer 120 and the rear face 230 of the passenger cab of the motor vehicle 110 is much less compared to a hitch located at rear end of the motor vehicle. While the trailer 120 is attached to the motor vehicle 110 via the Gooseneck or Fifth-wheel hitch location 210A and hitch connection 210B, an user or a sensor 135 would determine the length distance 240 between the rear face 230 of the passenger cab of the motor vehicle 110 and the front face 220 of the trailer 120, then the user or the sensor 135 will input that distance data into an interactive display. For instance, the sensor 135 can be a camera, a lidar, a radar, an infrared, an ultrasonic, or a user input into an interactive display. Thus, an input can be executed manually by a person or automatically by a computer system. For example, but not limited to, the interactive display can be fixed at a location within the passenger cab of the motor vehicle 110, such as on a dashboard or center console of the motor vehicle, with a wired connection. However, the interactive display can optionally be effortlessly relocated, moved and installed about the motor vehicle and surrounding environment, such as via a mobile device, tablet, or telephone, with a wireless connection.

Figure 3:
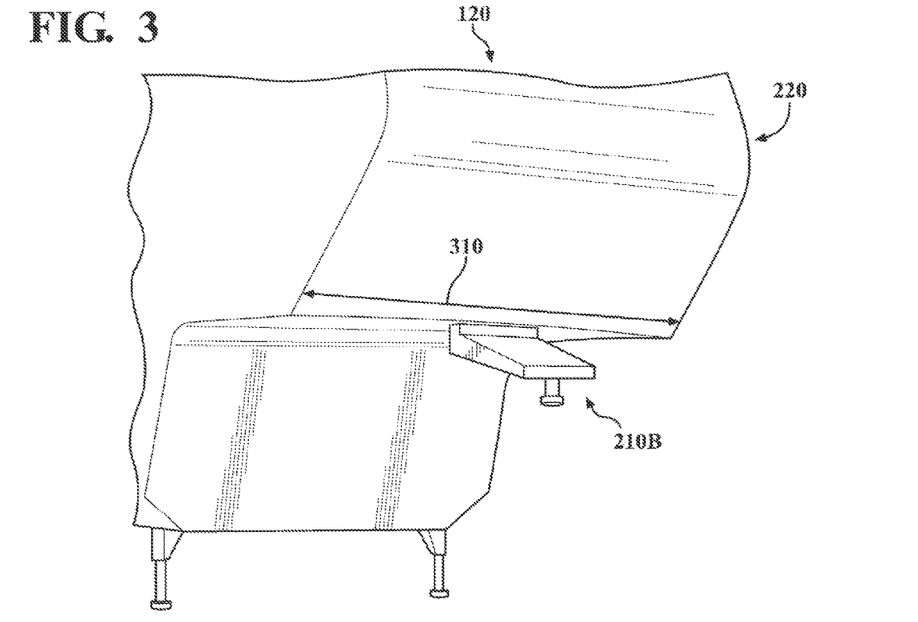
FIG. 3 illustrates an example of the width of a trailer.

FIG. 3 illustrates an example of the width of a trailer. A motor vehicle 110 is capable to pull or tow a variety of items, but the one of the common items to pull or tow is a trailer 120. Trailers come is a variety of size, both various lengths and widths. Specialized trailers are provided with a Gooseneck or Fifth-wheel hitch connection 210B for attachment of the motor vehicle 110 and the trailer 120. While the trailer 120 is attached to the motor vehicle 110 via the Gooseneck or Fifth-wheel hitch connection 210B, an user or a sensor 135 would determine the width distance 310 of the front face 220 of the trailer 120, then the user or the sensor 135 will input that distance data into an interactive display. Put another way, the user or the sensor 135 would determine the distance 310 from one side to another side of the front face 220 of the trailer 120; or the user or the sensor 135 would determine the distance 310 from the left side to the right side of the front face 220 of the trailer 120; then the user or the sensor 135 will input that width distance data into an interactive display. Again, for example but not limited to, the interactive display can be fixed at a location within the passenger cab of the motor vehicle, such as on a dashboard or center console of the motor vehicle. However, the interactive display can optionally be effortlessly relocated, moved and installed about the motor vehicle and surrounding environment, such as a mobile device, tablet, or telephone, with a wireless connection. Lastly, for instance, but not limited to, the sensor 135 can be a camera, a lidar, a radar, an infrared, an ultrasonic, or a user input into an interactive display.

Figure 4:
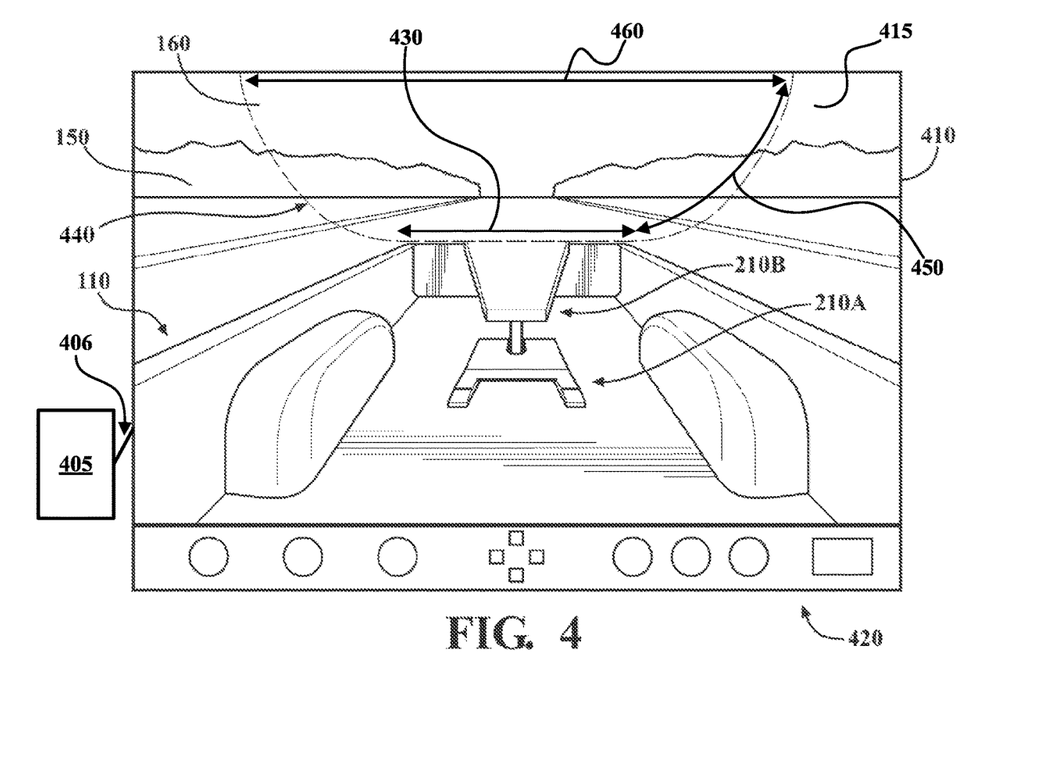
FIG. 4 illustrates an example of the interactive display rear field of view for the user with a driver assistance system for a combination of a motor vehicle and a trailer.

FIG. 4 illustrates an example of the interactive display rear field of view for the user with a driver assistance system for a combination of a motor vehicle and a trailer. For example, the interactive display 410 can be a HMI (Human Machine Interface) display or touchscreen display. Also, the interactive display 410 can have non-touchscreen controls and buttons 420 located upon. For example, but not limited to, the interactive display 410 can be fixed at a location within the passenger cab of the motor vehicle 110, such as on a dashboard or center console of the motor vehicle, with a wired connection. However, the interactive display can optionally be effortlessly relocated, moved and installed about the motor vehicle and surrounding environment, such as a mobile device, tablet, or telephone, with a wireless connection. Also, for example but not limited to, the interactive display 410 can receive data input or commands, directly or indirectly, from a user, sensor 135, or voice instructions.

A first camera 130 located on the rear face 230 of the passenger cab of the motor vehicle 110 provides a first image 150, which will be partially presented on the interactive display 410 located within the passenger cab of the motor vehicle. A second camera 160 located on the rear face of the trailer 120 provides a second image 160, different from the first image, which will be partially presented on the interactive display 410 located within the passenger cab of the motor vehicle. While the trailer 120 is attached to the motor vehicle 110 via the Gooseneck or Fifth-wheel hitch location 210A and hitch connection 210B, an user or a sensor 135 determines the length distance 240 between the rear face 230 of the passenger cab of the motor vehicle 110 and the front face 220 of the trailer 120, then the user inputs the length distance 240 into the interactive display 410 or the sensor 135 transmits the length distance 240 to the computer processing device 405. Furthermore, while the trailer 120 is attached to the motor vehicle 110 via the Gooseneck or Fifth-wheel hitch location 210A and hitch connection 210B, the user or a sensor 135 determines the width distance 310 of the front face 220 of the trailer 120, then the user inputs the width distance 310 into the interactive display 410 or the sensor 135 transmits the width distance 310 to the computer processing device 405. The computer processing device 405 can be a module, integrated in the interactive display 410, or a remote server connected wirelessly to the motor vehicle 110.

By way of the interactive display 410, the second image 160 is constructed with the first image 150 to generate a combined image 415 via the computer processing device 405. The computer processing device 405 can communicate with the interactive display 410 via a connection 406, with the connection 406 being a wired connection or a wireless connection. Also, the computer processing device 405 can be located within or outside of the motor vehicle 110, and the interactive display 410 can located within or outside of the motor vehicle 110, or vice versa or any combination thereof. Thus, the computer processing device 405 and the interactive display 410 can be in the same location or in different locations, within or outside the motor vehicle 110, communicating by connection 406. The first image 150 and the second image 160, as well as the combined image 415, can in particular be frames or parts of corresponding image sequences or videos. By the constructed position of the first camera image 150 and the second camera image 160, the combined image 415 represents an improved unobstructed rear field of view, rendering the trailer 120 being pulled or towed by the motor vehicle 110 via the Gooseneck or Fifth-wheel hitch location 210A and hitch connection 210B to be virtually partially transparent or invisible and thus reducing or removing "blind spots". Put another way, the combined image 415 is constructed with part of the second image 160 over a portion of the first image 150.

The interactive display 410 and the computer processing device 405 apply the user or the sensor 135 inputs of the length distance 240 (distance between the rear face of the passenger cab of the motor vehicle and the front face of the trailer) and the width distance 310 (width of the front face of the trailer) to an image function algorithm to generate the combined image 415 of part of the second image 160 constructed with the first image 150. The image function algorithm contains a plurality of sets of polynomial fit array coefficients, and applies a specific set of polynomial fit array coefficients based on the length distance 240 input. For further explanation, if the length distance 240 is less than a specified threshold distance, then a first set of the polynomial fit array coefficients are applied; if the length distance 240 is equal to or greater than a specified threshold distance, then a second set of the polynomial fit array coefficients are applied. The image function algorithm and the computer processing device 405 are continuously updating to generate and show a continuous combined image of the improved unobstructed rear field of view on the interactive display 410, with the continuous combined image being constructed from the second image 160 and the first image 150 captured in real-time. The computer processing device 405 generates the combined image 415 and the computer processing device 405 sends the combined image 415 to the interactive display 410 to be shown to the user. The combined image 415 includes a bowl view 440, that is filled with part of the second image 160, generated responsive to a bowl size 430. The combined image 415 production utilizes the bowl view 440, while the image function algorithm generates the bowl size 430. The bowl size 430 is related to the threshold distance, the length distance 240, and the width distance 310. By considering the length distance 240 and the width distance 310, the bowl size 430 is no longer a static amount, but rather the bowl size 430 is now dynamically created based off the two distances. Thus, the bowl view 440 generation is improved with the now dynamically generated bowl size 430. Therefore, the first image 150 and the second image 160 constructs the combined image 415 by using the bowl view 440 with the computer processing device 405.

The image function algorithm can be created by a common data monitoring/modeling tool, with a "polynomial regression" mathematical tool or equation, such as, but not limited to, a MATrix LABoratory ('MATLAB') formula. Furthermore, for example, the image function algorithm can be created by any common data monitoring tool, with a "polynomial regression" mathematical tool or equation, such as, but not limited to, Matlab/Simulink, Python, Google Sheets, Microsoft Excel, GNU Octave, Scilab, Maxima, Sage Math, AnyLogic, Enterprise Architect, Julia, Fusion 360, RapidMiner, RapidMiner Studio, RStudio, SOLID-WORKS, Mathematica, Ansys Fluent, TensorFlow, Inventor, Alteryx, Alteryx Designer, IDM SPSS, IDM SPSS Statistics, IDM SPSS Modeler, Posit, Logi Info, Anaconda, DataRobot, and SAP Analytics Cloud. A best fit curve based on a fixed set of values assists with creating the image function algorithm, with the values being: the width distance 310 of the front face 220 of the trailer 120 (input A) and the length distance 240 between the front face 220 of the trailer 120 and the rear face 230 of the passenger cab of the motor vehicle 110 (input B). The values of input A and input B for the image function algorithm create the output of the bowl size 430 for bowl view 440.

For example, but not limited to, in the regression method, the choice of degree and the evaluation of the fit's quality depend on judgments that are left to the user. It is well known in the art about this class of regression method wherein an effort to squeeze more correlation out of the image function algorithm than the data can support will sometimes produce an 'out-of-control' function that can wander wherever it pleases between those points, although it matches the data points. Therefore, a 'good' correlation coefficient (approaching 1.0) is not enough to assure a well-behaved or meaningful function. Decisions about an appropriateness of a result is more a matter of judgment than mathematics. Likewise, a 'perfect' fit, one in which all the data points are matched, is obtained by setting the degree of the regression to the number of data pairs minus one. However, one can choose a polynomial of the fourth order as the trend line to show a 'good' fit, which follows the data points closely, as the regression (R-squared/R2) is closer to 1.0.

The best curve fit is calculated based on a fourth/third degree polynomial generated curve that is closest to the desired curve generated using the actual data that works for the system, as indicated by:

$$F(x) = a_4 x^4 + a_3 x^3 + a_2 x^2 + a_1 x^1 + a_0$$

wherein x is the δx increments of the width distance 310 of the front face 220 of the trailer 120, and wherein $a_0, a_1, \ldots, a_n$ are the coefficients and n is the degree of the polynomial regression model under consideration.

Moreover, for example, but not limited to, if the length distance 240 is less than 52-58 inches (eg: threshold distance), then a first set of polynomial fit array coefficients [263, 31.6, 0.137, −0.0184, 4.25E-04] are applied to generate the bowl size 430. For example, but not limited to, if the length distance 240 is equal to or greater than 52-58 inches (eg: threshold distance), then a second set of polynomial fit array coefficients [274, −26.8, 5.13, −0.153, 1.42E-03] are applied to generate the bowl size 430. More specifically, but not limited to, if the length distance 240 is less than 55 inches (eg: threshold distance), then a first set of polynomial fit array coefficients [263, 31.6, 0.137, −0.0184, 4.25E-04] are applied to generate the bowl size 430. More specifically, but not limited to, if the length distance 240 is equal to or greater than 55 inches (eg: threshold distance), then a second set of polynomial fit array coefficients [274, −26.8, 5.13, −0.153, 1.42E-03] are applied to generate the bowl size 430.

In FIG. 4, the combination of the bowl size 430, bowl wall 450, and bowl top 460 make up the bowl view 440. The bowl size 430 is located at the bottom width or lowermost section of the bowl view 440 and generated by the image function algorithm. The bowl top 460 is located at the top width or uppermost section of the bowl view 440. The bowl top 460 relates to two fixed points in the combined image 415. These fixed points in the combined image 415 leave about 15 to 35 percent of the top of the interactive display 410 showing the first image 150 for blind spot handling. The bowl wall 450 is the curved sides of the bowl view 440 that extend from the bowl size 430 to the bowl top 460. The bowl size 430 and bowl wall 450 are adjustable portions of the bowl view 440. The bowl wall 450 is generated from a bowl equation responsive to the bowl size 430. The bowl equation generates the curve and thus the length of the bowl wall 450. In one embodiment, the bowl size is more narrow, i.e. 400, thus the distance from ends of the bowl size 430 to ends of the bowl top 460 will be a given length. The bowl equation will utilize that length and bowl size 430 to generate the bowl wall 450 with a curve to fit between the bowl size 430 and the bowl top 460. In another embodiment, the bowl size 430 is broader, i.e. 1000, thus the distance from the ends of the bowl size 430 to the ends of the bowl top 460 is shorter than the first embodiment. The bowl equation will generate a curve and bowl wall 450 to accommodate the changed position and length responsive to the longer bowl size 430. The bowl wall 450 will match the bowls size 430 and create the proper bowl view 440. Accordingly, the combination of bowl size 430 and bowl wall 450 and bowl top 460 construct the bowl view 440, which is formed in relation to the length distance 240 and the width distance 310. The bowl view 440 is viewable in place of the trailer 120 for the combined image 415 on the interactive display 410, thus constructing an unobstructed rearward field of view for the motor vehicle 110.

For instance, the interactive display rear field of view is a constructed bowl view, and is adjustable according to the inputs of respective distance data. The constructed bowl view presented on the interactive display 410 is formed by the combined image 415 of the first camera image 150 and the second camera image 160, so the combined image 415 represents an improved unobstructed rear field of view, rendering the trailer 120 being pulled or towed by the motor vehicle 110 via the Gooseneck or Fifth-wheel hitch location 210A and hitch connection 210B to be virtually partially transparent or invisible and thus reducing or removing "blind spots".

Figure 5:
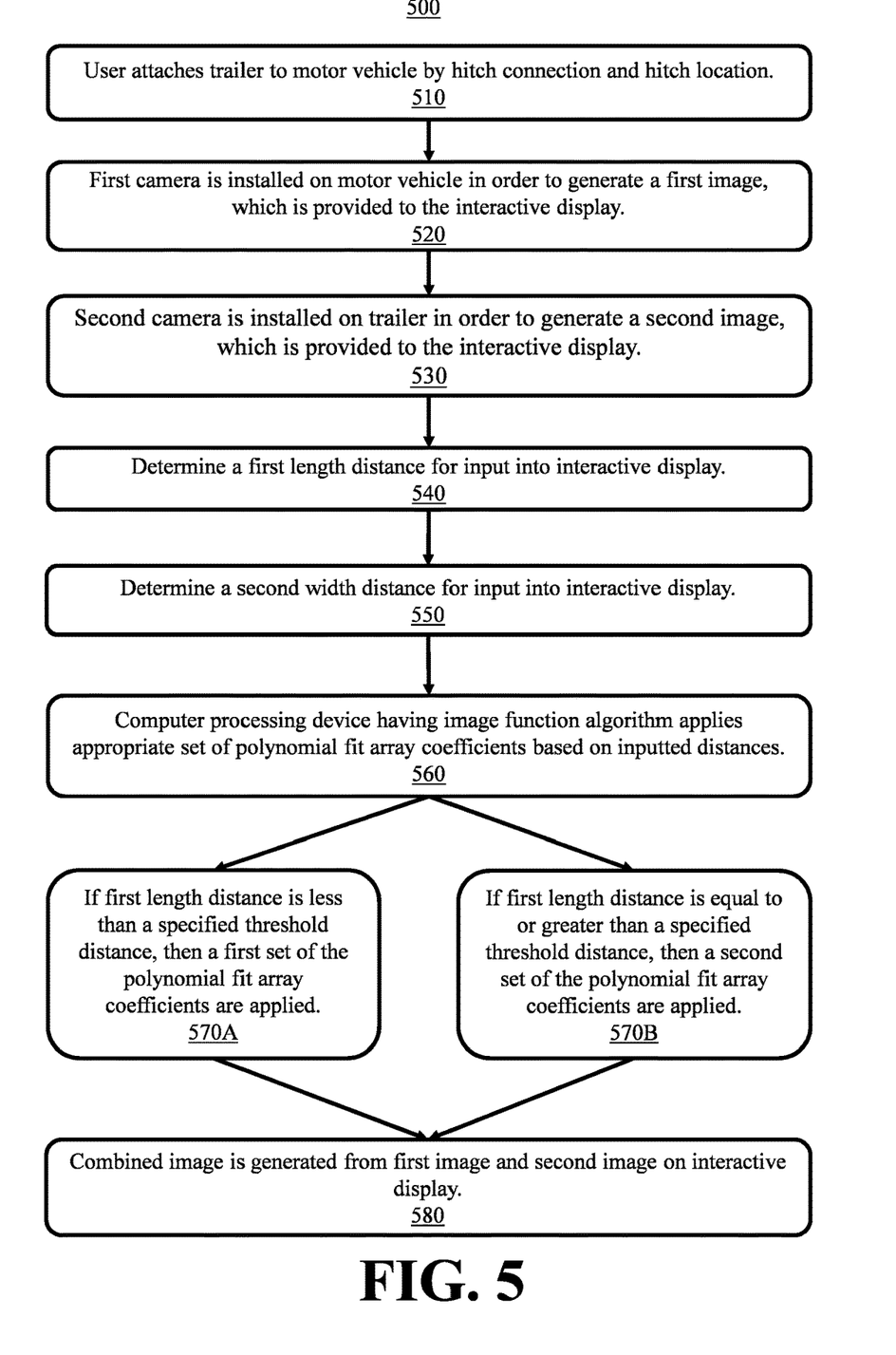
FIG. 5 illustrates an example of a flowchart diagram for a driver assistance system.

FIG. 5 illustrates an example of a flowchart diagram for a driver assistance system 500. FIG. 5 teaches the operation and apparatus of the overall driver assistance system, from the initial attachment of the trailer and motor vehicle to the concluding computer processing device configured to generate the combined image in relation to the first distance, the second distance, the threshold distance, and the bowl view. In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In Block 510, a user attaches a trailer to the motor vehicle by a hitch connection and hitch location.

In Block 520, a first camera is installed on the rear face of the passenger cab of the motor vehicle in order to generate a first image. Furthermore, the first image is provided to the interactive display.

In Block 530, a second camera is installed on the rear face of the trailer provides in order to generate a second image. Furthermore, the second image is provided to the interactive display.

In Block 540, the user or the sensor determines a first length distance between the rear face of the passenger cab of the motor vehicle and the front face of the trailer. Then, the first length distance is inputted into the interactive display. An input can be executed manually by a person or automatically by a computer system.

In Block 550, the user or the sensor determines a second width distance of the front face of the trailer. Then, the second width distance is inputted into the interactive display. Again, an input can be executed manually by a person or automatically by a computer system.

In Block 560, the interactive display with the computer processing device, having the image function algorithm, applies the appropriate set of polynomial fit array coefficients based on the inputted first length distance and the second width distance.

If the first length distance is less than a specified threshold distance, then a first set of the polynomial fit array coefficients are applied by the image function algorithm of the computer processing device, as indicated in Block 570A. If the first length distance is equal to or greater than a specified threshold distance, then a second set of the polynomial fit array coefficients are applied by the image function algorithm of the computer processing device, as indicated in Block 570B.

In Block 580, the trailer second camera image is constructed with the motor vehicle first camera image to generate the combined image on the interactive display as constructed by the computer processing device and image function algorithm.

Figure 6:
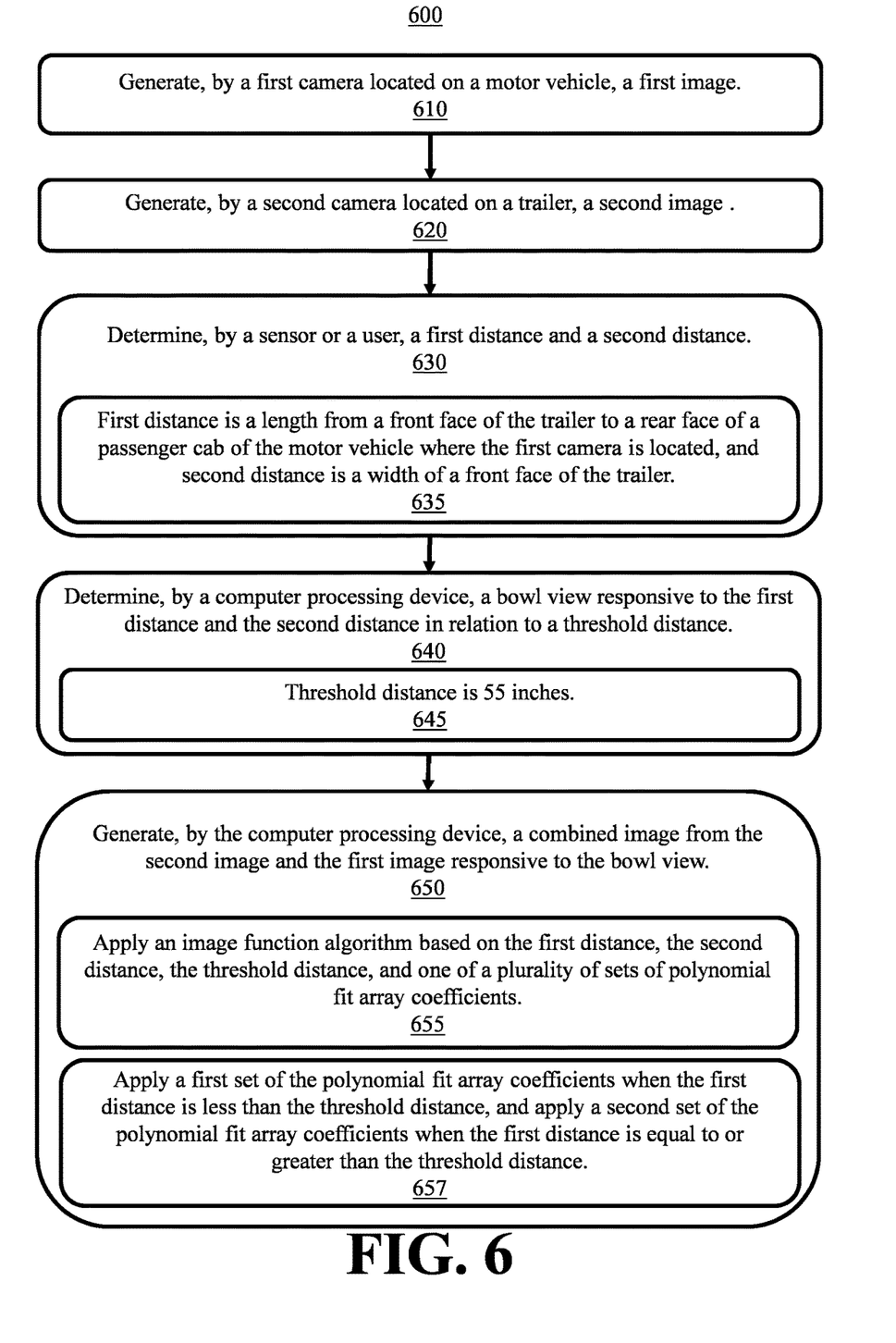
FIG. 6 illustrates an example of a flowchart diagram of a method for driver assistance system.

FIG. 6 illustrates an example of a flowchart diagram of a method 600 for driver assistance. The method 600 illustrates a process for generating the combined image 415 as shown in FIG. 4. In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In Block 610, generate a first image using a first camera located on the motor vehicle. In Block 620, generate a second image using a second camera located on the trailer. In Block 630, determine a first distance and a second distance by a sensor or a user using a computer processing device. In Block 635, the first distance is a length from a front face of the trailer to a rear face of a passenger cab of the motor vehicle where the first camera is located, and the second distance is a width of a front face of the trailer. In Block 640, determine a bowl view responsive to the first distance and the second distance in relation to a threshold distance using the computer processing device. In Block 645, the threshold distance is 55 inches. In Block 650, generate a combined image from the second image and the first image responsive to the bowl view using the computer processing device. In Block 655, apply an image function algorithm based on the first distance, the second distance, the threshold distance, and one of a plurality of sets of polynomial fit array coefficients. In Block 657, apply a first set of the polynomial fit array coefficients when the first distance is less than the threshold distance, and apply a second set of the polynomial fit array coefficients when the first distance is equal to or greater than the threshold distance.

The methods, processes, or algorithms disclosed herein can be deliverable to or implemented by a processing device, controller, or computer, which can include any existing programmable electronic control unit or dedicated electronic control unit. Also, the methods, processes, or algorithms can be implemented in a software executable object. Furthermore, the methods, processes, or algorithms can be stored as data and instructions executable by a controller or computer in many forms including, but not limited to, information permanently stored on non-writable storage media, such as ROM devices, and information alterably stored on writeable storage media, such as floppy disks, magnetic tapes, CDs, RAM devices, and other magnetic and optical media. Computing devices described herein generally include computer-executable instructions, where the instructions can be executable by one or more computing or hardware devices, such as those listed above. Such instructions and other data can be stored and transmitted using a variety of computer-readable media. Computer-executable instructions can be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions (e.g., from a memory, a computer-readable medium, etc.) and executes these instructions, thereby performing one or more processes, including one or more of the processes described herein. Moreover, the methods, processes, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims of the invention. While the present disclosure is described with reference to the figures, it will be understood by those skilled in the art that various changes can be made and equivalents can be substituted without departing from the scope and spirit of the present disclosure. The words used in the specification are words of description rather than limitation, and it is further understood that various changes can be made without departing from the scope and spirit of the invention disclosure. In addition, various modifications can be applied to adapt the teachings of the present disclosure to particular situations, applications, and/or materials, without departing from the essential scope and spirit thereof. Additionally, the features of various embodiments can be combined to form further embodiments of the invention that cannot be explicitly described or illustrated. While various embodiments can have been described as providing advantages or being preferred over other embodiments or prior art implementations with respect to one or more desired characteristics, those of ordinary skill in the art recognize that one or more features or characteristics could be compromised to achieve desired overall system attributes, which depend on the specific application and implementation. These attributes can include, but not limited to, strength, cost, durability, life cycle cost, appearance, marketability, size, packaging, weight, serviceability, manufacturability, ease of assembly, etc. Therefore, to the extent any embodiments are described as less desirable than other embodiments or prior art implementations with respect to one or more characteristics, these embodiments are not outside the scope of the disclosure and can be desirable for particular applications. Thus, the present disclosure is thus not limited to the particular examples disclosed herein, but includes all embodiments falling within the scope of the appended claims.

The invention claimed is:

1. A driver assistance system for a combination of a motor vehicle and a trailer, the driver assistance system comprising:
    a first camera located on the motor vehicle, the first camera configured to generate a first image;
    a second camera located on the trailer, the second camera configured to generate a second image; and
    a computer processing device configured to:
    determine a longitudinal first distance and an axial second distance by a sensor or a user input;
    determine a bowl view responsive to one of a plurality of sets of polynomial fit array coefficients, the one of a plurality of sets of polynomial fit array coefficients determined by the first distance and the second distance in relation to a threshold distance; and
    generate a combined image from the second image and the first image responsive to the bowl view.

2. The driver assistance system according to claim 1, wherein the first distance is a length from a front face of the trailer to a rear face of a passenger cab of the motor vehicle where the first camera is located.

3. The driver assistance system according to claim 1, wherein the sensor is at least one of the first camera, a lidar, a radar, an infrared, an ultrasonic.

4. The driver assistance system according to claim 1, wherein the second distance is a width of a front face of the trailer.

5. The driver assistance system according to claim 1, wherein the combined image is transmitted to an interactive display.

6. The driver assistance system according to claim 1, further comprising a hitch located within a cargo bed of the motor vehicle.

7. The driver assistance system according to claim 1, wherein the threshold distance is 55 inches.

8. The driver assistance system according to claim 1, wherein the computer processing device is configured to apply an image function algorithm based on the first distance, the second distance, the threshold distance, and the one of a plurality of sets of polynomial fit array coefficients.

9. The driver assistance system according to claim 8, wherein a first set of the polynomial fit array coefficients are applied when the first distance is less than the threshold distance.

10. The driver assistance system according to claim 8, wherein a second set of the polynomial fit array coefficients are applied when the first distance is equal to or greater than the threshold distance.

11. The driver assistance system according to claim 1, wherein the bowl view includes to have an adjustable bowl size, an adjustable bowl wall and a fixed bowl top.

12. The driver assistance system according to claim 11, wherein the adjustable bowl size is a lowermost section of the bowl view.

13. A method for driver assistance for a combination of a motor vehicle and a trailer, the method comprising:
    generating, by a first camera located on the motor vehicle, a first image;
    generating, by a second camera located on the trailer, a second image;
    determining, by a sensor or a user, a longitudinal first distance and an axial second distance;
    determining, by a computer processing device, a bowl view responsive to one of a plurality of sets of polynomial fit array coefficients, the one of a plurality of sets of polynomial fit array coefficients determined by the first distance and the second distance in relation to a threshold distance; and
    generating, by the computer processing device, a combined image from the second image and the first image responsive to the bowl view.

14. The method according to claim 13, wherein the first distance is a length from a front face of the trailer to a rear face of a passenger cab of the motor vehicle where the first camera is located.

15. The method according to claim 13, wherein the second distance is a width of a front face of the trailer.

16. The method according to claim 13, wherein the threshold distance is 55 inches.

17. The method according to claim 13, wherein generating the combined image includes applying an image function algorithm based on the first distance, the second distance, the threshold distance, and the one of a plurality of sets of polynomial fit array coefficients.

18. The method according to claim 17, wherein generating the combined image includes applying a first set of the polynomial fit array coefficients when the first distance is less than the threshold distance.

19. The method according to claim 17, wherein generating the combined image includes applying a second set of the polynomial fit array coefficients when the first distance is equal to or greater than the threshold distance.

20. A non-transitory computer-readable storage medium storing instructions, which when executed on a computer, cause the computer to perform a method for driver assistance for a combination of a motor vehicle and a trailer, the method comprising:
- generating, by a first camera located on the motor vehicle, a first image;
- generating, by a second camera located on the trailer, a second image;
- determining, by a sensor or a user, a longitudinal first distance and an axial second distance;
- determining, by a computer processing device, a bowl view responsive to one of a plurality of sets of polynomial fit array coefficients, the one of a plurality of sets of polynomial fit array coefficients determined by the first distance and the second distance in relation to a threshold distance; and
- generating, by the computer processing device, a combined image from the second image and the first image responsive to the bowl view.

* * * * *